United States Patent
Kim et al.

(10) Patent No.: US 10,421,487 B2
(45) Date of Patent: Sep. 24, 2019

(54) APPARATUS AND METHOD FOR CONTROLLING REAR WHEEL STEERING SYSTEM

(71) Applicants: Hyundai Motor Company, Seoul (KR); Kia Motors Corporation, Seoul (KR)

(72) Inventors: Jong Min Kim, Gwangmyeong-si (KR); Dae Suk Jung, Hoengcheon-myeon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/809,311

(22) Filed: Nov. 10, 2017

(65) Prior Publication Data
US 2018/0297634 A1    Oct. 18, 2018

(30) Foreign Application Priority Data
Apr. 12, 2017 (KR) .................. 10-2017-0047192

(51) Int. Cl.
*B62D 7/15* (2006.01)
*B60G 17/018* (2006.01)
(Continued)

(52) U.S. Cl.
CPC ............. *B62D 7/159* (2013.01); *B62D 7/148* (2013.01); *B62D 17/00* (2013.01)

(58) Field of Classification Search
CPC ... B62D 7/15; B62D 7/14; B62D 5/04; B62D 5/0481; B62D 7/159; B60G 17/016; B60G 17/018; B60C 23/04; B62B 15/00
See application file for complete search history.

(56) References Cited

U.S. PATENT DOCUMENTS 4,332,395 A * 6/1982 Zech .................. B62B 15/004
                                                        280/213
5,026,081 A * 6/1991 Bauer .................... B62D 7/159
                                                        180/412
(Continued)

FOREIGN PATENT DOCUMENTS

CN  106467038 A  *  3/2017  ........... B62D 5/0481
DE    3911453 A1 * 10/1989  ........... B62D 5/0484
(Continued)

*Primary Examiner* — Yuri Kan
(74) *Attorney, Agent, or Firm* — Morgan, Lewis & Bockius LLP

(57) ABSTRACT

An apparatus and a method for controlling a rear wheel steering (RWS) system, may include determining, by a controller, whether an abnormality occurs in a rear wheel alignment based on information collected from the vehicle; determining, by the controller, a correction amount of the rear wheel alignment for correcting the abnormality occurring in the rear wheel alignment using predetermined data based on one or more of the information collected from the vehicle when the abnormality is determined to occur in the rear wheel alignment; correcting, by the controller, a rear wheel control position determined based on variable information related to an RWS control using the determined correction amount of the rear wheel alignment; and controlling, by the controller, an RWS actuator of the vehicle based on the corrected rear wheel control position, and an apparatus for controlling an RWS system.

16 Claims, 4 Drawing Sheets

(51) Int. Cl.
*B60C 23/04* (2006.01)
*B60G 17/016* (2006.01)
*B62B 15/00* (2006.01)
*B62D 17/00* (2006.01)
*B62D 7/14* (2006.01)

(56) References Cited

U.S. PATENT DOCUMENTS

| | | | | |
|---|---|---|---|---|
| 7,831,353 | B1* | 11/2010 | Barron | B60G 17/0162 |
| | | | | 280/5.512 |
| 2008/0091317 | A1* | 4/2008 | Green | B60G 17/0162 |
| | | | | 701/38 |
| 2011/0106382 | A1* | 5/2011 | Kageyama | B62D 5/008 |
| | | | | 701/42 |
| 2017/0320363 | A1* | 11/2017 | Hung | B60C 23/0416 |

FOREIGN PATENT DOCUMENTS

| | | |
|---|---|---|
| EP | 0 733 008 B1 | 4/1998 |
| KR | 10-2013-0030635 A | 3/2013 |
| KR | 10-2013-0053699 A | 5/2013 |
| KR | 10-2014-0044507 A | 4/2014 |
| KR | 10-2014-0073069 A | 6/2014 |
| KR | 10-2014-0073262 A | 6/2014 |
| KR | 10-2016-0044648 A | 4/2016 |
| KR | 10-1612670 B1 | 4/2016 |

\* cited by examiner

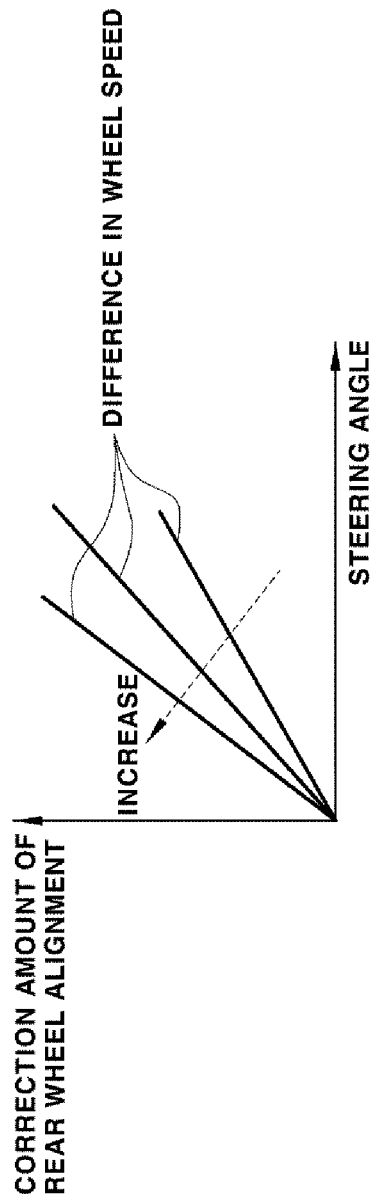

APPARATUS AND METHOD FOR CONTROLLING REAR WHEEL STEERING SYSTEM

CROSS-REFERENCE TO RELATED APPLICATION

The present application claims priority to Korean Patent Application No. 10-2017-0047192, filed on Apr. 12, 2017, the entire contents of which is incorporated herein for all purposes by this reference.

BACKGROUND OF THE INVENTION

Field of the Invention

The present invention relates to an apparatus and a method for controlling a rear wheel steering (RWS) system. More particularly, the present invention relates to an apparatus and a method for controlling an RWS system, which are configured for improving a straightness and driving stability of a vehicle by correcting a rear wheel control position by an amount of distortion or leaning when the distortion or leaning occurs in a rear wheel alignment.

Description of Related Art

Generally, a steering system, which reduces a steering wheel manipulation force of a driver to enable the driver to perform a lightened and rapid steering manipulation using an electronic control unit (ECU), may be largely classified into an electronic power steering system configured to an assist amount by adding an electronic control valve for controlling a hydraulic pressure to a typical hydraulic power steering system, and an electric power steering system configured to control an assist amount by only a motor driving.

An active front steering (AFS) system is well-known, in which a variable steering gear ratio mechanism configured with planetary gears and harmonic gears is provided between a steering wheel and a steering actuator in a vehicle on which the above-described power steering system is applied, and an output angle with respect to a steering input of the steering wheel by the driver is varied through an operation of the variable steering gear ratio mechanism wherein a behavior of the vehicle can be increasingly stabilized.

The AFS system receives a coordination control command, control angle information, and the like for a vehicle posture stabilization from an electronic control device (for example, an electronic stabilization control (ESC) ECU) to perform the coordination control, and the AFS system electronically varies a steering gear ratio to improve driving convenience of the driver and stability of the vehicle.

Meanwhile, in the case of a conventional vehicle, only front wheels are steered to change a traveling direction of the vehicle, and, at the present point, a timing of a generation of a lateral force at a front wheel is different from that of generation of a lateral force at a rear wheel wherein the traveling direction of the vehicle does not coincide with a desired direction of the driver.

Consequently, the steering system is applicable to the rear wheel, and a rear wheel steering (RWS) system is applied to reduce a turning radius of the vehicle when the vehicle is parking or is turning at a low speed, improving driving stability when the vehicle is turning while driving at a high speed.

That is, the RWS system which is one of a chassis control system enables the rear wheel to be steered by disposing an actuator at a rear suspension of the vehicle wherein convenience is improved by decreasing the turning radius at the low speed and driving stability is improved by minimizing a lateral slip angle in avoidance of an obstacle while the vehicle is driving at the high speed.

In recent years, aside from a conventional integrated RWS system, research is actively performed on a left and right independent RWS system provided with a device ("an actuator") configured for independently controlling toe angles of a rear left wheel and a rear right wheel to change and control a rear steering angle.

Comparing with a front steering system, a four-wheel steering system including the above-described left and right independent RWS system can improve not only vehicle maneuverability by decreasing a turning radius of a vehicle through a reverse phase control of the left and right independent RWS system when the vehicle is turning at a low speed, but also driving stability of the vehicle through an in-phase control of the left and right independent RWS system when the vehicle is turning at a high speed.

Meanwhile, when distortion or leaning occurs in a rear wheel alignment due to abrasion of a rear wheel component including a tire or an RWS actuator in a vehicle on which the RWS system is mounted, the vehicle is difficult to drive straight using a rear wheel thrust force.

However, the related art does not teach an RWS control technique configured for correcting a rear wheel control position ("a rear wheel helm angle") by an amount of distortion or leaning when the distortion or leaning occurs in a rear wheel alignment to improve straightness of the vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus and a method for controlling a rear wheel steering (RWS) system, which are configured for improving straightness and driving stability of a vehicle by correcting a rear wheel control position by an amount of distortion or leaning of a rear wheel alignment when the distortion or leaning occurs in the rear wheel alignment.

Various aspects of the present invention are directed to providing a method for controlling an RWS system, which includes determining, by a controller, whether an abnormality occurs in a rear wheel alignment based on information collected from a vehicle; when the abnormality is determined to occur in the rear wheel alignment, determining, by the controller, a correction amount of the rear wheel alignment for correcting the abnormality occurring in the rear wheel alignment using predetermined data based on one or more of the information collected from the vehicle; correcting, by the controller, a rear wheel control position determined based on variable information related to an RWS control using the determined correction amount of the rear wheel alignment; and controlling, by the controller, an RWS actuator of the vehicle based on the corrected rear wheel control position.

Various aspects of the present invention are directed to providing an apparatus for controlling an RWS system, which includes a detector configured to detect operation information and state information related to the vehicle; an RWS basic logic member configured to determine a rear wheel control position based on variable information related to an RWS control, which is collected from the vehicle; a wheel alignment abnormality determination member configured to determine whether an abnormality occurs in a rear wheel alignment based on the operation information and the state information which are detected by the detector; when the abnormality is determined to occur in the rear wheel alignment by the wheel alignment abnormality determination member, a correction amount determination member configured to determine a correction amount of the rear wheel alignment using predetermined data based on one or more of the operation information and the state information which are detected by the detector; and a correction member configured to correct the rear wheel control position determined in the RWS basic logic member using the correction amount of the rear wheel alignment, Which is determined in the correction amount determination member, and output a control signal for controlling an RWS actuator based on the corrected rear wheel control position.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 4 is a graph illustrating a correction amount of a rear wheel alignment, which is determined according to a steering angle and a difference in wheel speed in an exemplary embodiment of the present invention.

Figure 1:
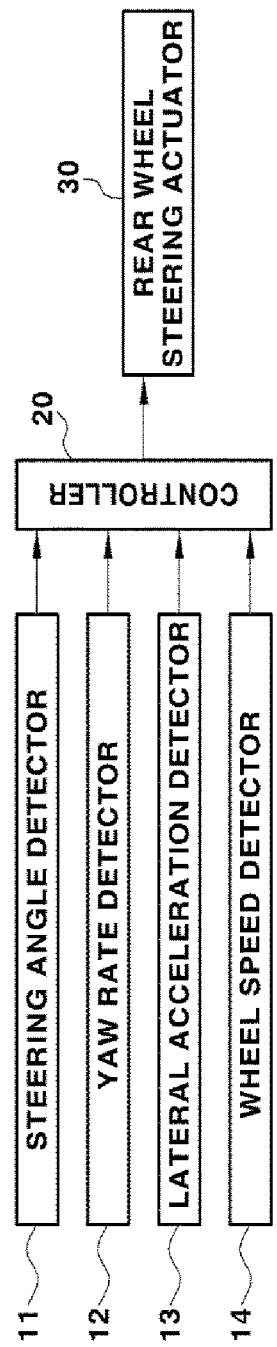
FIG. 1 is a block diagram illustrating a configuration of a control apparatus according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Various aspects of the present invention are directed to providing an apparatus and a method for controlling a rear wheel steering (RWS) system, which are configured for improving a straightness and driving stability of a vehicle by correcting a rear wheel control position by a correction amount corresponding to an amount of abnormality occurring in a rear wheel alignment when the abnormality, including distortion or leaning, occurs in the rear wheel alignment.

Here, the rear wheel control position before correction may refer to a target rear wheel angle value which is determined by an RWS basic logic based on variable information related to an RWS control, which is collected from the vehicle.

That is, the rear wheel control position before correction may be a target RWS helm angle, which is a target when the RWS control is performed, that is, a target RWS angle ("an angle control value for a rear wheel") for steering the rear wheel, and the rear wheel control position is an RWS control value which is determined by a known RWS basic logic and refers to a value obtained by adding an operation amount of an actuator to an initial rear wheel alignment predetermined position of the rear wheel.

In an exemplary embodiment of the present invention, to prevent leaning of the vehicle in a left or right direction from occurring while a driver maintains a state in which the vehicle is driving straight forward, the rear wheel control position determined by the RWS basic logic is corrected by a correction amount of a rear wheel alignment and then the RWS control is performed to target the corrected rear wheel control position.

That is, a controller configured to perform the RWS control determines the corrected rear wheel control position as a target value to output a control signal for controlling a steering angle of the rear wheel ("a rear wheel helm angle"), and an RWS actuator operates according to the control signal output from the controller to set the steering angle of the rear wheel as the target value.

As is described above, the control apparatus and the control method according to an exemplary embodiment of the present invention may be usefully applied to a left and right independent RWS system.

FIG. 1 is a block diagram illustrating a configuration of the control apparatus according to an exemplary embodiment of the present invention, and illustrates a configuration of an apparatus configured to perform a rear wheel alignment correction.

As shown in the drawing, the apparatus for controlling an RWS system according to an exemplary embodiment of the present invention includes, as detectors for detecting operation information and state information related to a vehicle, a steering angle detector 11 configured to detect a steering angle according to a steering wheel manipulation of the driver, a yaw rate detector 12 configured to detect a yaw rate of the vehicle, a lateral acceleration (LATAC) detector 13 configured to detect a LATAC of the vehicle, and a wheel speed detector 14 configured to detect a rear wheel speed of the vehicle.

Here, the steering angle detector 11, the yaw rate detector 12, and the LATAC detector 13 may respectively be a conventional steering angle detector, a conventional yaw rate detector, and a conventional LATAC detector which are provided in the vehicle, and the above-described detectors are respectively configured to detect a steering angle, a yaw rate, and a LATAC to output electrical signals representing the detected steering angle, yaw rate, and LATAC to a controller 20.

The wheel speed detector 14 may be a conventional wheel speed detector which is disposed at each of a rear left wheel and a rear right wheel and configured to detect a wheel speed of each thereof.

Furthermore, the apparatus for controlling an RWS system according to an exemplary embodiment of the present invention includes the controller 20 configured to receive information ("detector signals") which is detected by the detectors 11, 12, 13, and 14, and the controller 20 detects an abnormality of a rear wheel alignment to determine a correction amount of the rear wheel alignment, corrects a rear wheel control position, which is determined by the RWS basic logic, by the determined correction amount of the rear wheel alignment, and outputs a control signal for controlling an operation of an RWS actuator 30 according to the corrected rear wheel control position ("a final target rear wheel helm angle").

Figure 2:
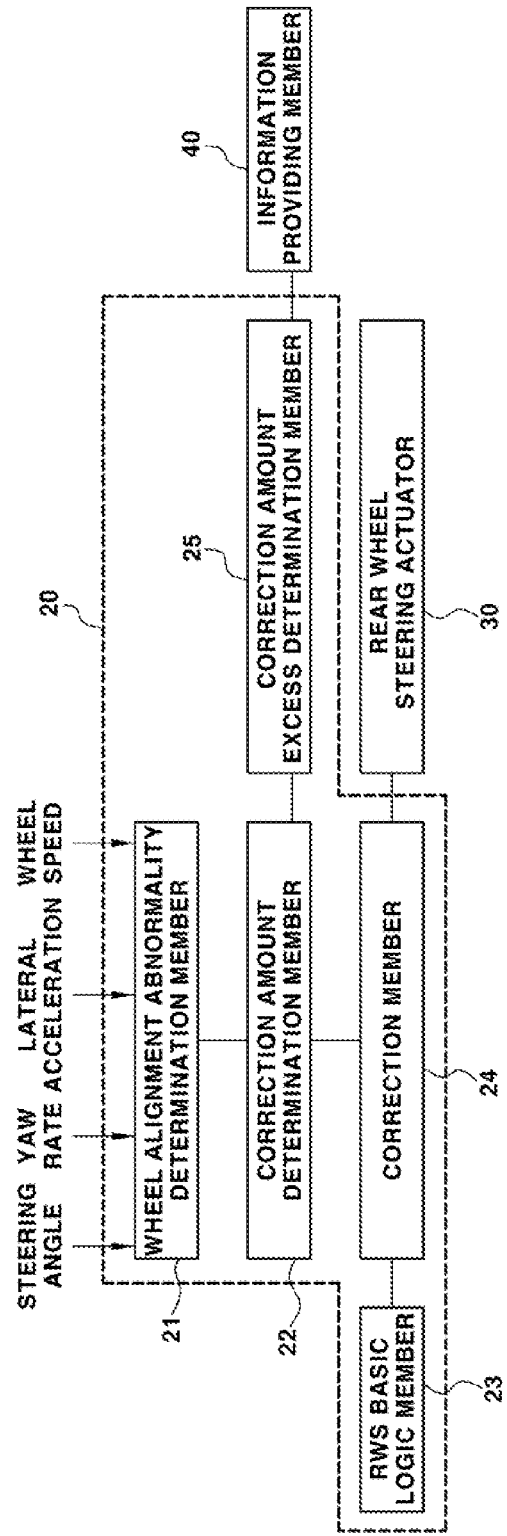
FIG. 2 is a detailed block diagram illustrating a configuration of a controller in a control apparatus according to an exemplary embodiment of the present invention.

FIG. 2 is a detailed block diagram illustrating a configuration of the controller 20 in the control apparatus according to an exemplary embodiment of the present invention.

As shown in the drawing, the controller 20 includes an RWS basic logic member 23 configured to determine the rear wheel control position based on the variable information related to the RWS control, which is collected from the vehicle, a wheel alignment abnormality determination member 21 configured to determine whether an abnormality occurs in the rear wheel alignment based on information input from the detectors 11, 12, 13, and 14, a correction amount determination member 22 configured to determine the correction amount of the rear wheel alignment based on one or more of the information input from the detectors 11, 12, 13, and 14, and a correction member 24 configured to correct the rear wheel control position determined at the RWS basic logic member 23 by the determined correction amount of the rear wheel alignment and output a control signal for controlling the rear wheel to the corrected rear wheel control position.

Thus, the RWS actuator 30 operates according to the control signal output from the correction member 24 so that the RWS control is performed, wherein the correction for the abnormality (that is, distortion, leaning, or the like) of the rear wheel alignment has been performed.

Here, the correction amount of the rear wheel alignment is for correcting a difference between a current position of the rear wheel alignment and an initial predetermined position thereof when the abnormality, including distortion or leaning, occurs in the rear wheel alignment.

In an exemplary embodiment of the present invention, the determination of whether the abnormality occurs in the rear wheel alignment by the wheel alignment abnormality determination member 21 refers to the determination of whether to commence a correction logic for correcting the abnormality occurring in the rear wheel alignment, and, when the detected information input from the detectors 11, 12, 13, and 14 are satisfied with a predetermined condition, the wheel alignment abnormality determination member 21 is configured to determine that the abnormality occurs in the rear wheel alignment to commence a correction mode.

Furthermore, after the rear wheel alignment abnormality determination member 21 determines that the abnormality occurs in the rear wheel alignment to commence the correction mode, when the detected information input from the detectors 11, 12, 13, and 14 are satisfied with a predetermined correction release condition, the rear wheel alignment abnormality determination member 21 enables a correction release to be performed for aborting the correction mode.

When the correction release is performed, the roar wheel alignment abnormality determination member 21 aborts operations of the correction amount determination member 22 and the correction member 24 to prevent the correction amount determination member 22 from outputting the correction amount of the rear wheel alignment (that is, the correction amount of the rear wheel alignment is "0"), and the correction member 24 from correcting the rear wheel control position.

The RWS basic logic member 23, and the RWS basic logic and a process thereof for determining the rear wheel control position in the RWS basic logic member 23 are already applied to a conventional RWS system and thus a detailed description thereof will be omitted.

Furthermore, the controller 20 may further include a correction amount excess determination member 25 that activates an information providing member 40 to inform the driver of a correction amount excess generation when the controller 20 determines the correction amount excess generation based on the correction amount of the rear wheel alignment, which is determined in the correction amount determination member 22.

Hereinbefore, the configuration of the control apparatus according to an exemplary embodiment of the present invention has been described, and a control method according to an exemplary embodiment of the present invention will be described below.

Figure 3:
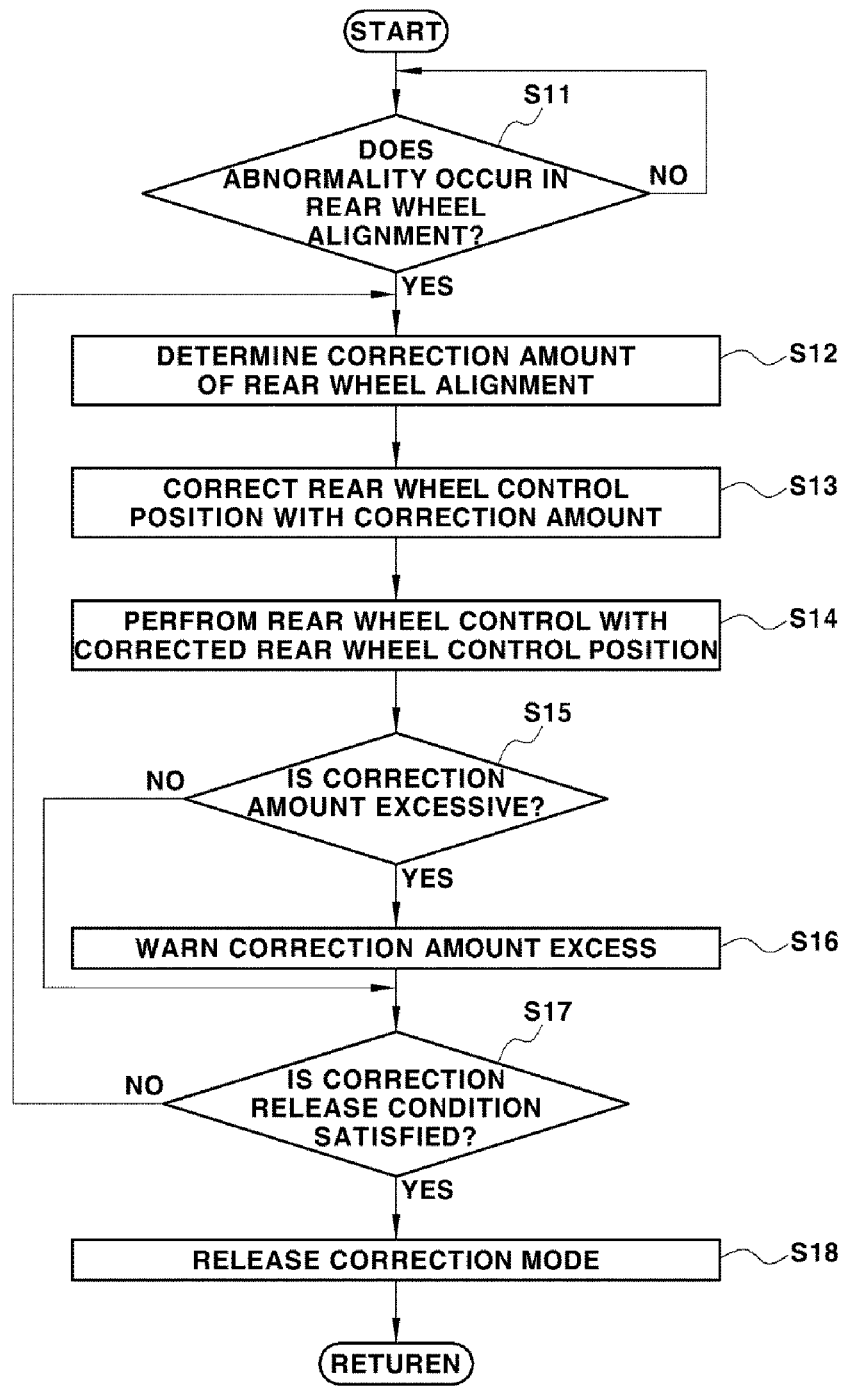
FIG. 3 is a flowchart illustrating a control method according to an exemplary embodiment of the present invention.

FIG. 3 is a flowchart illustrating the control method according to an exemplary embodiment of the present invention.

The method for controlling an RWS system according to an exemplary embodiment of the present invention includes determining whether an abnormality, including distortion, leaning, or the like, occurs in a rear wheel alignment based on information collected from a vehicle while the vehicle is driving (S11), determining a correction amount of the rear wheel alignment to correct the abnormality occurring in the rear wheel alignment (S12), correcting a rear wheel control position, which is determined in the RWS basic logic member 23, by the determined correction amount of the rear wheel alignment (S13), and correcting an RWS based on the corrected rear wheel control position ("a final target rear wheel helm angle") (S14).

First, the determining of whether the abnormality occurs in the rear wheel alignment (S11) is performed by the wheel alignment abnormality determination member 21, and, when a steering angle detected by the steering angle detector 11, a yaw rate of a vehicle, which is detected by the yaw rate detector 12, a LATAC of the vehicle, which is detected by the LATAC detector 13, and a difference in wheel speed between a rear right wheel and a rear left wheel, which is detected by the wheel speed detector 14, are satisfied with predetermined conditions, the wheel alignment abnormality determination member 21 determines that the abnormality occurs in the rear wheel alignment.

When all conditions, in which the steering angle is within a first predetermined range, the yaw rate and the LATAC of the vehicle are respectively less than or equal to a predetermined reference yaw rate value and a predetermined reference LATAC value, and the difference in wheel speed between the rear left Wheel and the rear right wheel is equal to or greater than a predetermined reference speed difference value, are satisfied, the wheel alignment abnormality determination member 21 determines that the abnormality occurs in the rear wheel alignment.

When a state in which all the conditions are satisfied is maintained for a predetermined time period, the wheel alignment abnormality determination member 21 may be configured to finally determine that the abnormality occurs in the rear wheel alignment.

The first predetermined range may be a small steering angle around a steering wheel on-center, a steering angle within the first predetermined range may be an angle in a state in which the driver unconsciously finely manipulates the steering wheel to drive the vehicle straight, that is, to prevent the vehicle from leaning toward a left or right direction when distortion or leaning occurs in the rear wheel alignment.

Also, a condition in which the steering angle is less than a lower limit value (for example, 0.5 degrees) of the first predetermined range may be a condition in a state in which the distortion or leaning does not occur in the rear wheel alignment so that the vehicle is driving straight without an unconscious steering wheel manipulation of the driver, and such a state is excluded from a condition in which a correction is performed with respect to the abnormality (for example, distortion, leaning, or the like) occurring in the rear wheel alignment.

Furthermore, a condition in which the steering angle is greater than an upper limit value (for example, 3 degrees) of the first predetermined range may be a condition in which the driver manipulates the steering wheel according to his or her intent to steer the vehicle at a desired angle instead of driving the vehicle straight, and the first predetermined range may represent a state in which the steering wheel is manipulated over a predetermined angle by the driver (that is, a steering input is performed through the steering wheel according to a steering intent of the driver).

Furthermore, each of conditions in which the detected yaw rate value is greater than the reference yaw rate value (for example, 2 degrees/second) and the detected LATAC value is greater than the reference LATAC value (for example, 0.1 g) is a condition in which the steering wheel is manipulated by the driver, and the conditions, in which the detected yaw rate value is greater than the reference yaw rate value and the detected LATAC value is greater than the reference LATAC value, are determined that the steering intent of the driver exists rather than an intent to maintain a state of driving the vehicle straight, thus being excluded from the condition in which the abnormality occurs in the rear wheel alignment.

Moreover, a value of the difference in wheel speed between the rear left wheel and the rear right wheel, which is determined in the wheel alignment abnormality determination member 21, is a positive value, and the value of the difference in wheel speed may be determined as an absolute value of a value obtained by subtracting the wheel speeds of both the rear left and right wheels from each other.

The reference speed difference value is a value (for example, 5 kilometers per hour (kph)) which is tuned at a vehicle development stage to consider that the abnormality occurs in the rear wheel alignment at a level of requiring a correction when the difference in wheel speed is greater than the reference speed difference value, and, when the difference in wheel speed is less than the reference speed difference value, the wheel alignment abnormality determination member 21 considers that the abnormality does not occur in the rear wheel alignment.

Further, when a state of satisfying all the above-described conditions is maintained for a predetermined time period (for example, 2 seconds), the wheel alignment abnormality determination member 21 is configured to determine that the abnormality occurs in the rear wheel alignment, and otherwise, when the state of satisfying all the above-described conditions is not maintained for the predetermined time period, the wheel alignment abnormality determination member 21 is configured to consider that a determination condition is not valid, determining that the abnormality does not occur in the rear wheel alignment.

Next, when the wheel alignment abnormality determination member 21 determines that the abnormality occurs in the rear wheel alignment, a correction mode of the rear wheel alignment is commenced, and, as the correction mode of the rear wheel alignment is commenced, the correction amount determination member 22 determines a correction amount of the rear wheel alignment (S12).

Here, the correction amount determination member 22 is provided to determine the correction amount of the rear wheel alignment based on the detected information by the steering angle detector 11 and the wheel speed detector 14, and more particularly, the correction amount determination member 22 is provided to determine the correction amount of the rear wheel alignment using predetermined data, which is stored, based on the steering angle detected by the angle detector 11 and the difference in wheel speed between the rear left wheel and the rear right wheel, which is obtained from the information detected by the wheel speed detector 14.

Here, the predetermined data is data which is input to and stored in the correction amount determination member 22 in advance to enable the correction amount determination member 22 to determine the correction amount of the rear wheel alignment with the steering angle and the difference in wheel speed as input variables, and the predetermined data may be obtained based on a preliminary test performed at the vehicle development stage and an evaluation result of the preliminary test.

The predetermined data is data predefining a correlation between two variables, that is, the steering angle and the difference in wheel speed, and the correction amount of the rear wheel alignment, which is to be determined, and the predetermined data may be a map, a table, or an equation configured for determining the correction amount of the rear wheel alignment based on the steering angle and the difference in wheel speed.

FIG. 4 is a graph illustrating a correction amount of the rear wheel alignment, which is determined based on the steering angle and a value of the difference in wheel speed, and exemplifies that the correction amount of the rear wheel alignment is set to a large value as the steering angle becomes larger and the value of the difference in wheel speed becomes larger, and an actual value of the correction amount may be variously tuned.

Subsequently, after the correction mode of the rear wheel alignment is commenced, when the RWS basic logic member 23 determines the rear wheel control position and the correction amount determination member 22 determines the correction amount of the rear wheel alignment, the correction member 24 receives the determined rear wheel control position and the determined correction amount of the rear wheel alignment and corrects the received rear wheel control position by the received correction amount of the rear wheel alignment (S13).

Here, the corrected rear wheel control position is a final target rear wheel helm angle (that is, a target rear wheel steering angle for steering the rear wheel) which is a control target for the RWS control when the abnormality occurs in the rear wheel alignment, or is a value corresponding to the final target rear wheel helm angle, and the correction member 24 generates to output an actuator control signal for performing the RWS control to the corrected rear wheel control position.

Consequently, an operation of the RWS actuator 30 is controlled according to the actuator control signal output from the correction member 24, and thus the RWS control is performed with the corrected rear wheel control position as a target value (S14).

Thereafter, the correction amount excess determination member 25 compares the correction amount of the rear wheel alignment, which is input from the correction amount determination member 22, with a predetermined value and determines whether the correction amount is excessive (S15), and, when the correction amount is determined to be excessive over the predetermined value, the correction amount excess determination member 25 activates the information providing member 40 to warn the driver (S16).

At the present point, the information providing member 40 informs the driver that distortion or leaning occurs in the rear wheel alignment beyond a predetermined level, and the information providing member 40 may be a warning device in a cluster, a display device (for example, a navigation display) inside the vehicle, an alarm output device, or the like.

In a state in which the correction mode of the rear wheel alignment is commenced, when the wheel alignment abnormality determination member 21 determines that a predetermined correction release condition is satisfied based on the information detected by the detectors 11, 12, 13, and 14 (S17), a correction release mode is commenced to abort the correction (S18).

At the present point, a correction release condition may be a condition which is not satisfied with one or more of the conditions for determining whether the abnormality occurs in the rear wheel alignment.

That is, when one or more of correction mode commencement conditions, which are the conditions for determining whether the abnormality occurs in the rear wheel alignment, are not satisfied, the correction release condition enables the correction release mode to be commenced.

One or more of the conditions, in which the steering angle is out of the first predetermined range, the yaw rate and the LATAC of the vehicle respectively exceed the reference yaw rate value and the reference LATAC value, and the difference in wheel speed between the rear left wheel and the rear right wheel exceeds the reference speed difference value, are satisfied the wheel alignment abnormality determination member 21 releases the correction mode.

Preferably, to prevent the correction mode from being frequently commenced and released, the wheel alignment abnormality determination member 21 may release the correction mode when a state of satisfying the correction release conditions is maintained for a predetermined time period (for example, two seconds).

When the correction release mode is commenced, the wheel alignment abnormality determination member 21 aborts the operations of the correction amount determination member 22 and the correction member 24 to prevent the correction amount of the rear wheel alignment from being output (that is, the correction amount of the rear wheel alignment is "0") to prevent the correction member 24 from correcting the rear wheel control position.

As is described above, in accordance with the apparatus and the method for controlling an RWS according to an exemplary embodiment of the present invention, an effect configured for improving straightness and driving stability of the vehicle can be provided by correcting the rear wheel control position by the amount of distortion or leaning when the distortion or leaning occurs in the rear wheel alignment.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and describe to explain certain principles of the invention and there practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling a rear wheel steering (RWS) system, comprising:
   determining, by a controller, whether an abnormality occurs in a rear wheel alignment based on information collected from a vehicle;
   when the abnormality is determined to occur in the rear wheel alignment, determining, by the controller, a correction amount of the rear wheel alignment for correcting the abnormality occurring in the rear wheel alignment using predetermined data based on one or more of the information collected from the vehicle;
   correcting, by the controller, a rear wheel control position determined based on variable information related to an RWS control using the determined correction amount of the rear wheel alignment; and
   controlling, by the controller, an RWS actuator of the vehicle based on the corrected rear wheel control position,
   wherein, in the determining of the correction amount of the rear wheel alignment, the controller is configured to determine the correction amount of the rear wheel alignment using the predetermined data based on a steering angle according to a steering wheel manipulation by a driver and a difference in wheel speeds between a rear left wheel and a rear right wheel.

2. The control method of claim 1, wherein the information collected from the vehicle includes the steering angle according to the steering wheel manipulation by the driver, a yaw rate of the vehicle, a lateral acceleration thereof, and wheel speeds of the rear left wheel and the rear right wheel.

3. The control method of claim 2, wherein, when conditions, in which the steering angle is within a first predetermined range, the yaw rate of the vehicle is less than or equal to a predetermined reference yaw rate value, the lateral acceleration of the vehicle is less than or equal to a predetermined reference lateral acceleration value, and a difference in the wheel speeds between the rear left wheel and the rear right wheel is equal to or greater than a predetermined reference speed difference value, are satisfied, the controller is configured to determine that the abnormality occurs in the rear wheel alignment.

4. The control method of claim 3, wherein, when a state of satisfying the conditions related to the steering angle, the yaw rate of the vehicle, the lateral acceleration thereof, and the difference in the wheel speeds between the rear left wheel and the rear right wheel is maintained for a predetermined time period, the controller is configured to determine that the abnormality occurs in the rear wheel alignment.

5. The control method of claim 1, wherein the predetermined data is configured such that the correction amount of the rear wheel alignment is changed to a larger value as the steering angle becomes larger and the difference in the wheel speeds becomes larger.

6. The control method of claim 1, further including:
activating an information providing member and warning the driver when the controller compares the determined correction amount of the rear wheel alignment with a predetermined value and determines that the determined correction amount exceeds the predetermined value.

7. The control apparatus of claim 2, further including:
controlling, by the controller, the RWS actuator of the vehicle without performing the correcting based on the rear wheel control position determined based on the variable information related to the MS control when one or more conditions, in which the steering angle is not in a first predetermined range, the yaw rate of the vehicle exceeds a predetermined reference yaw rate value, the lateral acceleration of the vehicle exceeds a predetermined reference lateral acceleration value, and a difference in the wheel speeds between the rear left wheel and the rear right wheel exceeds a predetermined reference speed difference value, are satisfied as correction release conditions.

8. The control method of claim 7, further including:
controlling, by the controller, the RWS actuator of the vehicle without performing the correcting based on the rear wheel control position determined based on the variable information related to the RWS control when a state of satisfying one or more of the correction release conditions related to the steering angle, the yaw rate of the vehicle, the lateral acceleration thereof, and the difference in wheel speed between the rear left wheel and the rear right wheel is maintained for a predetermined time period.

9. An apparatus for controlling a rear wheel steering (RWS) system, comprising:
a detector configured to detect operation information and state information related to a vehicle;
an RWS basic logic member configured to determine a rear wheel control position based on variable information related to an RWS control, which is collected from the vehicle;
a wheel alignment abnormality determination member configured to determine whether an abnormality occurs in a rear wheel alignment based on the operation information and the state information which are detected by the detector;
a correction amount determination member configured to determine a correction amount of the rear wheel alignment using predetermined data based on one or more of the operation information and the state information which are detected by the detector when the abnormality is determined to occur in the rear wheel alignment by the wheel alignment abnormality determination member; and
a correction member configured to correct the rear wheel control position determined in the RWS basic logic member using the correction amount of the rear wheel alignment, which is determined in the correction amount determination member, and to output a control signal for controlling an RWS actuator based on the corrected rear wheel control position,
wherein the correction amount determination member determines the correction amount of the rear wheel alignment using the predetermined data based on a steering angle which is information detected by a steering angle detector and a difference in wheel speed between a rear left wheel and a rear right wheel of a rear wheel, which is obtained from information detected by a wheel speed detector.

10. The control apparatus of claim 9, wherein the detector includes;
the steering angle detector configured to detect the steering angle according to a manipulation state of a steering wheel by a driver;
a yaw rate detector configured to detect a yaw rate of the vehicle;
a lateral acceleration detector configured to detect a lateral acceleration of the vehicle; and
the wheel speed detector configured to detect a wheel speed of the rear wheel of the vehicle.

11. The control apparatus of claim 10, wherein; when conditions, in which the steering angle is within a first predetermined range, the yaw rate of the vehicle is less than or equal to a predetermined reference yaw rate value, the lateral acceleration of the vehicle is less than or equal to a predetermined reference lateral acceleration value, and a difference in wheel speeds between the rear left wheel and the rear right wheel of the rear wheel is equal to or greater than a predetermined reference speed difference value, are satisfied, the wheel alignment abnormality determination member determines that the abnormality occurs in the rear wheel alignment.

12. The control apparatus of claim 11, wherein, when a state of satisfying the conditions related to the steering angle, the yaw rate of the vehicle, the lateral acceleration thereof, and the difference in the wheel speeds between the rear left wheel and the rear right wheel is maintained for a predetermined time period, the wheel alignment abnormality determination member determines that the abnormality occurs in the rear wheel alignment.

13. The control apparatus of claim 9, wherein the predetermined data is configured such that the correction amount of the rear wheel alignment is changed to a larger value as the steering angle becomes larger and the difference in the wheel speeds becomes larger.

14. The control apparatus of claim 10, further including:
a correction amount excess determination member configured to receive the correction amount of the rear wheel alignment, which is determined in the correction amount determination member, to compare the received correction amount with a predetermined value, and, when the received correction amount is determined to exceed the predetermined value, to activate an information providing member to warn the driver.

15. The control apparatus of claim 10, wherein, when one or more conditions, in which the steering angle is out of a first predetermined range, the yaw rate of the vehicle exceeds a predetermined reference yaw rate value, the lateral acceleration of the vehicle exceeds a predetermined reference lateral acceleration value, and a difference in wheel speeds between the rear left wheel and the rear right wheel of the rear wheel exceeds a predetermined reference speed difference value, are satisfied as correction release conditions, the wheel alignment abnormality determination member controls an RWS actuator of the vehicle without performing the correcting based on the rear wheel control position determined in the RWS basic logic member.

16. The method of claim 15, further including:
when a state of satisfying one or more of the correction release conditions related to the steering angle, the yaw rate of the vehicle, the lateral acceleration thereof, and the difference in wheel speed between the rear left wheel and the rear right wheel is maintained for a predetermined time period, the wheel alignment abnormality determination member controls the RWS actuator of the vehicle based on the rear wheel control position determined in the RWS basic logic member without performing the correcting.

* * * * *